May 29, 1956 J. MANUEL 2,747,476
DUMP TRUCK BODY
Filed Nov. 25, 1952 6 Sheets-Sheet 1
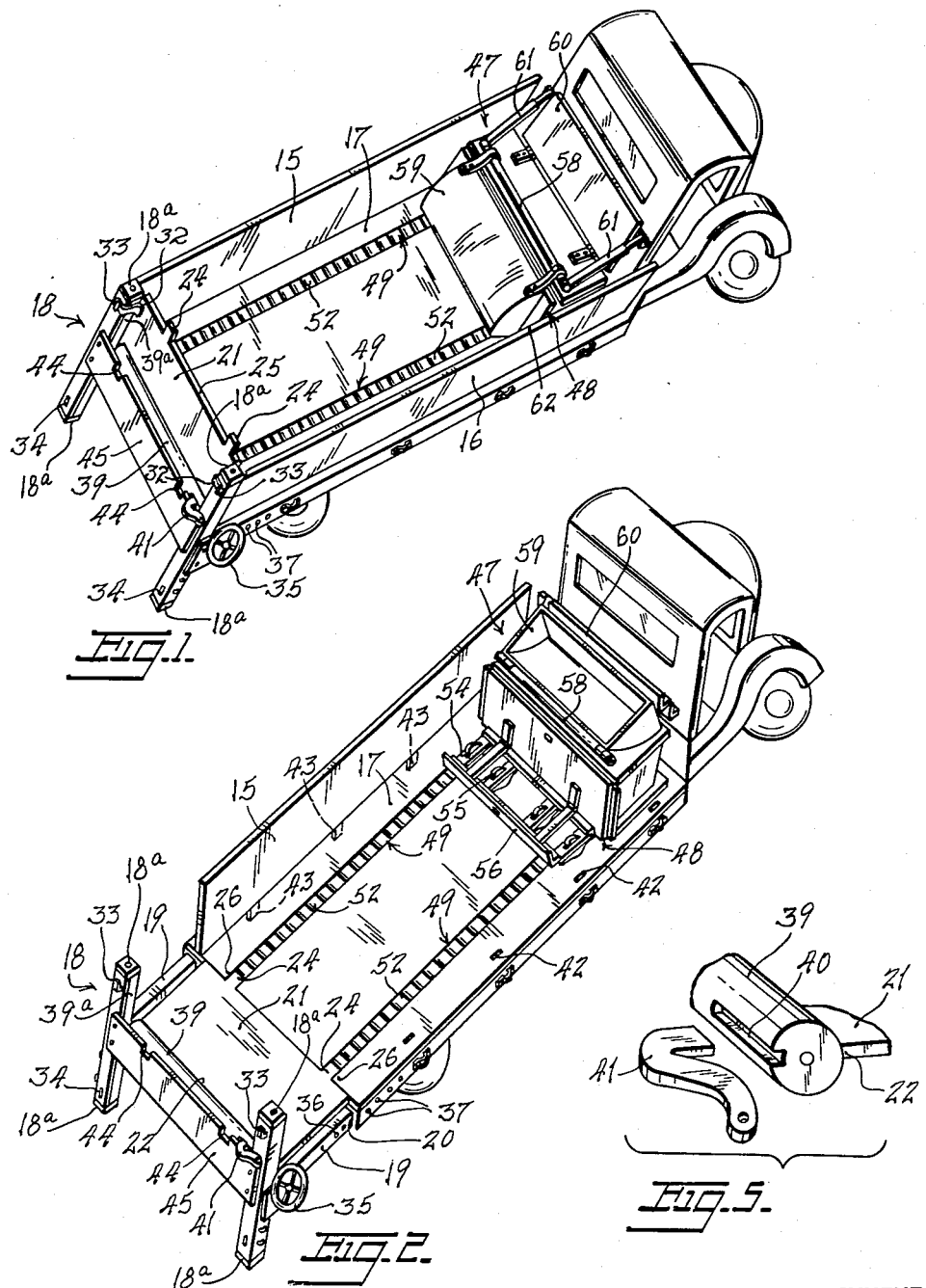
INVENTOR.
JOSEPH MANUEL
BY
Zoltan Holochek
ATTORNEY May 29, 1956  J. MANUEL  2,747,476
DUMP TRUCK BODY Filed Nov. 25, 1952  6 Sheets-Sheet 2

INVENTOR.
JOSEPH MANUEL
BY
*Zoltan H. Holochek*
ATTORNEY

May 29, 1956

J. MANUEL 2,747,476

DUMP TRUCK BODY

Filed Nov. 25, 1952

INVENTOR.
JOSEPH MANUEL
BY
ATTORNEY

May 29, 1956  J. MANUEL  2,747,476
DUMP TRUCK BODY

Filed Nov. 25, 1952  6 Sheets-Sheet 4

INVENTOR.
JOSEPH MANUEL
BY
Zoltan Holachek
ATTORNEY

May 29, 1956  J. MANUEL  2,747,476
DUMP TRUCK BODY
Filed Nov. 25, 1952  6 Sheets-Sheet 5

INVENTOR.
JOSEPH MANUEL
BY
Zoltan Polachek
ATTORNEY

May 29, 1956

J. MANUEL 2,747,476

DUMP TRUCK BODY

Filed Nov. 25, 1952

INVENTOR.
JOSEPH MANUEL
BY
ATTORNEY

United States Patent Office 2,747,476
Patented May 29, 1956

2,747,476

DUMP TRUCK BODY

Joseph Manuel, New York, N. Y.

Application November 25, 1952, Serial No. 322,459

9 Claims. (Cl. 94—44)

This invention relates to new and useful improvements in a truck body.

More particularly, the present invention proposes the construction of an improved truck body which when mounted on a truck will equip the truck to serve either as a dump truck or as a lumber truck.

Another object of the present invention proposes forming the truck body with a rear end which can be moved outwardly to provide a dump opening between the rear end of the body and the rear edge of the floor of the body.

Still further, the present invention proposes constructing the truck body with a pusher carriage to shove material on the floor of the body out the dump opening.

As a further object, the present invention proposes arranging a tail gate on the rear end frame so that it can be lowered to cover the dump opening and form an extension of the floor or fully lowered to a vertical position to provide a spreader or spreader support when the dump opening is being used.

The present invention further proposes a novel arrangement of a truck body having sides secured to a floor with their rear ends spaced wider apart than their front ends and a pusher carriage with extensible slide members spring biased against the side to follow the sides as the busher carriage travels along the floor of the body.

Another object of the present invention is to provide novel means to assist in loading and unloading the body when it is used as a lumber truck body and means to raise and lower the tail gate.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a truck body constructed and arranged in accordance with the present invention mounted on a truck and in closed position for gravel or sand or the like.

Fig. 2 is a view similar to Fig. 1 but showing the rear end frame extended from the floor of the body with the tail gate down forming an extension of the floor one side being removed for clarity.

Fig. 5 is a detail view illustrating the locking means for the lumber loading rollers shown in the several figures.

Figure 3:
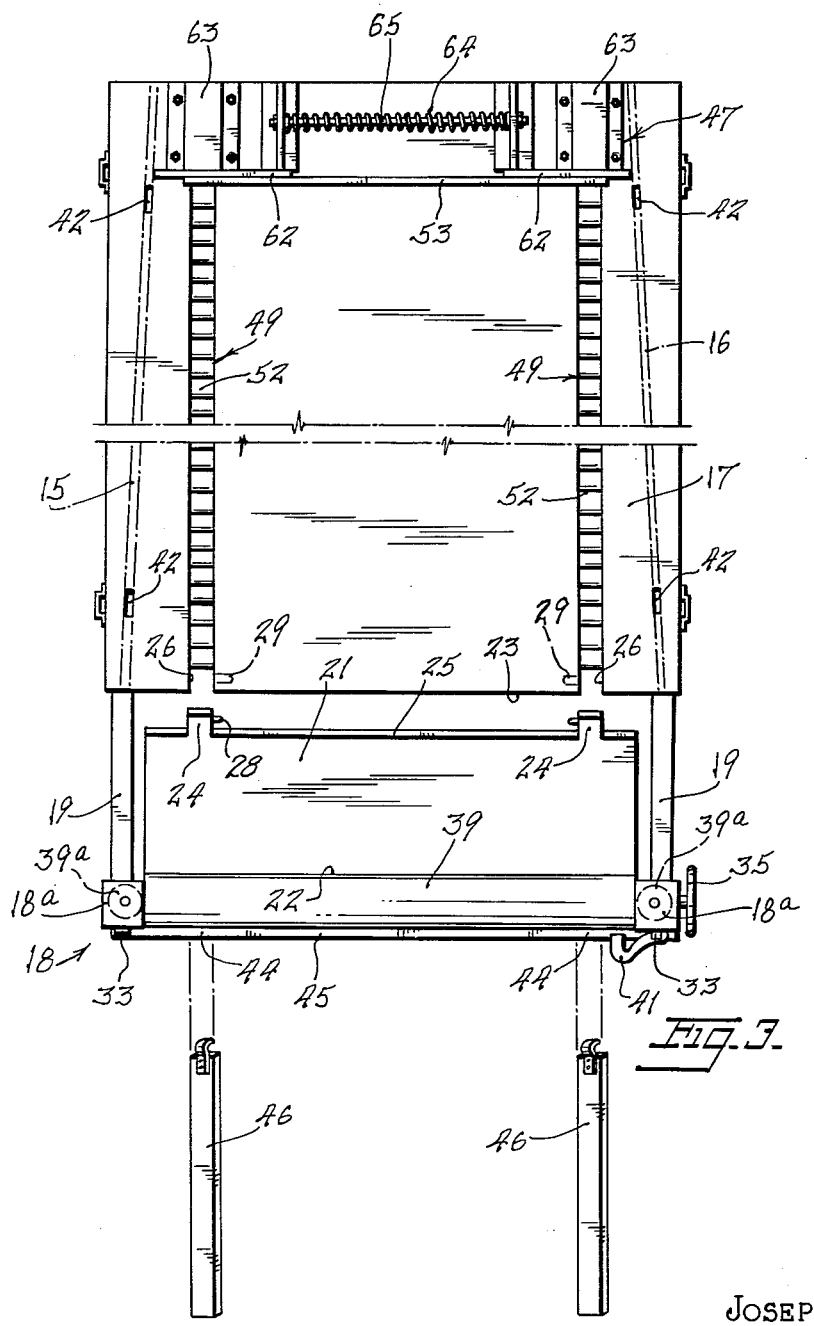
Fig. 3 is a plan view of the truck body with sides removed and tail gate only partly down.

Referring more particularly to the drawings, the improved truck body of the present invention has two sides 15 and 16, a floor 17 and an end or rear end frame 18. Body extension members or beams 19 slidably connect the end frame 18 with the floor 17, one end of each of the spaced beams being fixed to the end frame and the other end slidably connected to the floor.

Beams or extension members 19 may be any shape but are shown as channels slidable in channels 20 having their flanges secured to the underside of the floor 17.

A tail gate 21 is pivotally connected adjacent its lower edge 22 with the rear end frame 18 and is pivotable inwardly and downwardly toward floor 17 to form an extension of the floor when the end frame 18 is extended from the rear edge 23 of the floor by the extension members 19.

Figure 4:
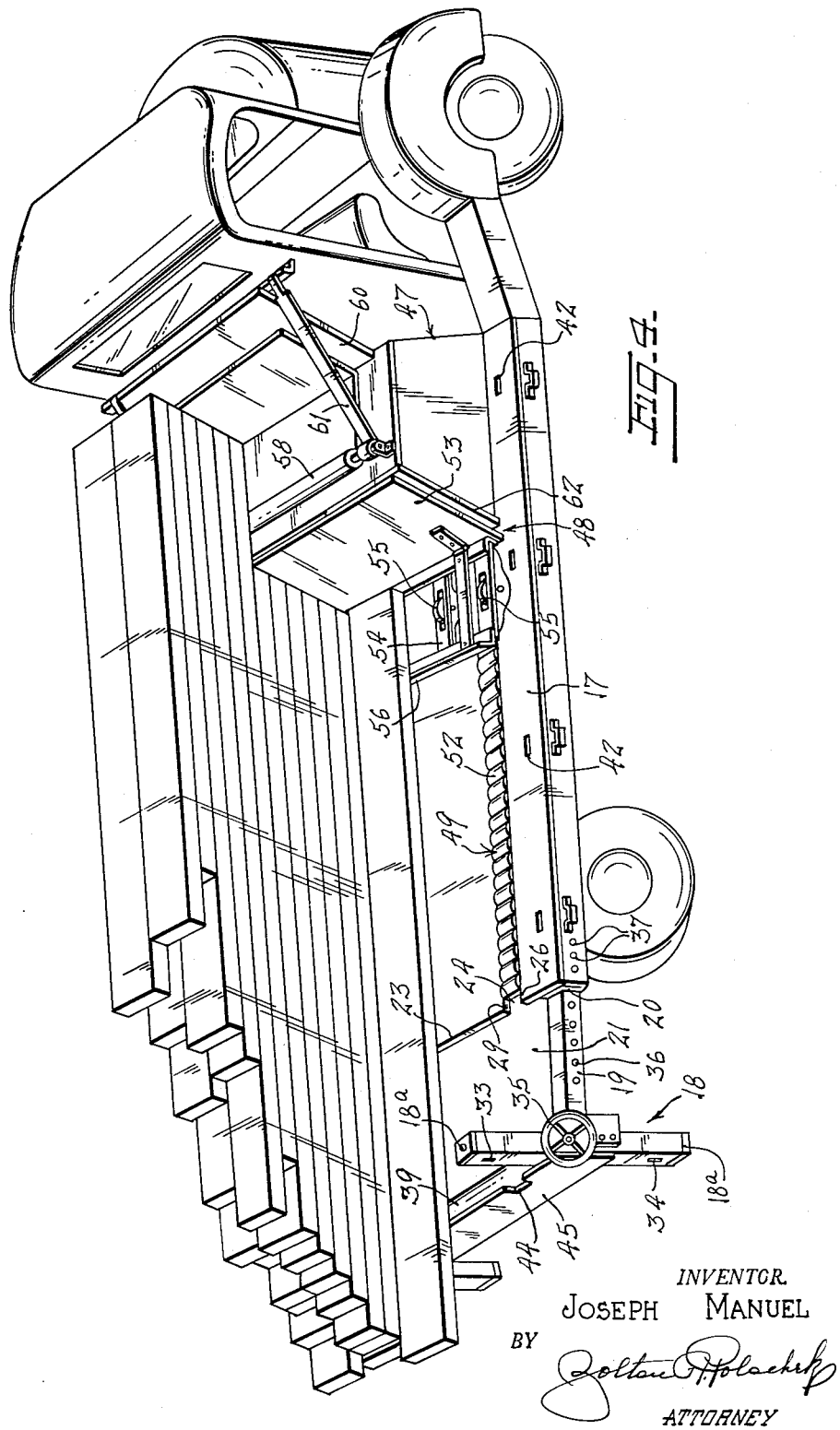
Fig. 4 is a view similar to Fig. 2 but illustrating how lumber may be loaded on the new truck body.
Figures 10, 11:
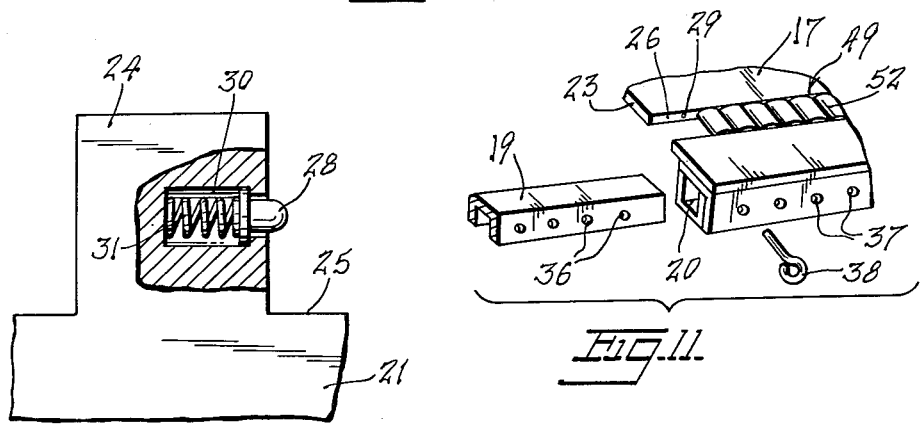
Fig. 10 is a fragmentary detail view partly broken away and in section of a part of the tail gate showing a detent button seated in one of the tail gate projections for locking the tail gate to the body.
Fig. 11 is a fragmentary detail view illustrating how the slidable extension members or beams can be secured.

Tail gate 21 has projections 24 provided on its top edge 25 and mating recesses 26 in the floor 17 to receive the projections when the tail gate is lowered to form a flush extension of the floor. In this manner, coacting means are provided to hold the tail-gate parallel with the floor when the tail-gate is lowered to the floor abutting position illustrated in Figs. 2 and 4. Means to lock the tail-gate in this position may be provided by a locking pin 27 carried by each projection 24 and extending from a side edge thereof or by a detent button 28 shown in Fig. 10, one sidewall of each recess 26 being provided with an opening 29, Fig. 8, to receive them. Detent button 28 is seated in a cavity 30 and biased outwardly by a spring 31.

Figure 7:
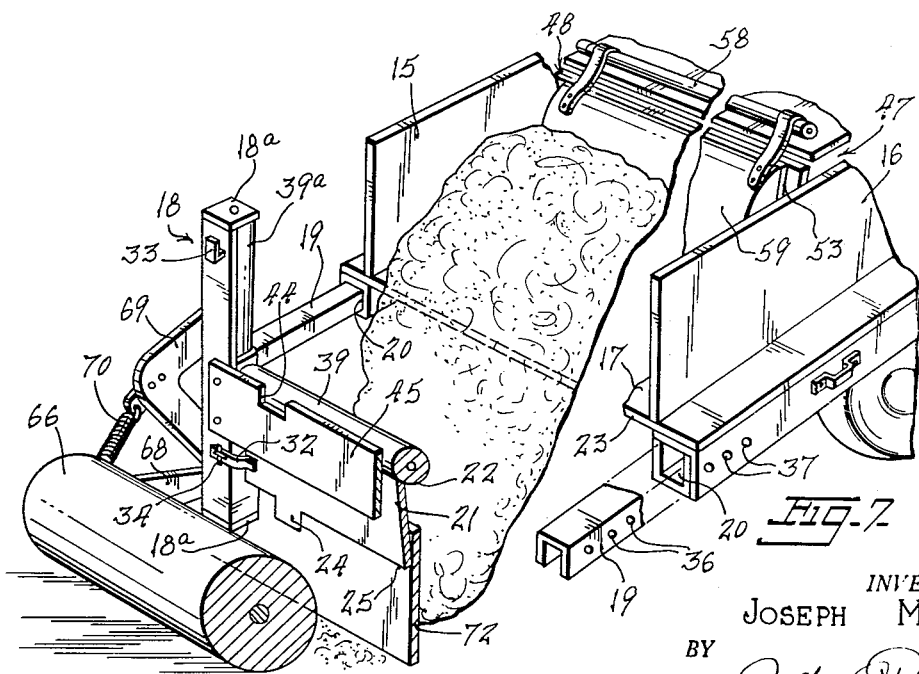
Fig. 7 is a perspective view of the new truck body illustrating its use as a dump truck with an earth roller attached.
Figure 8:
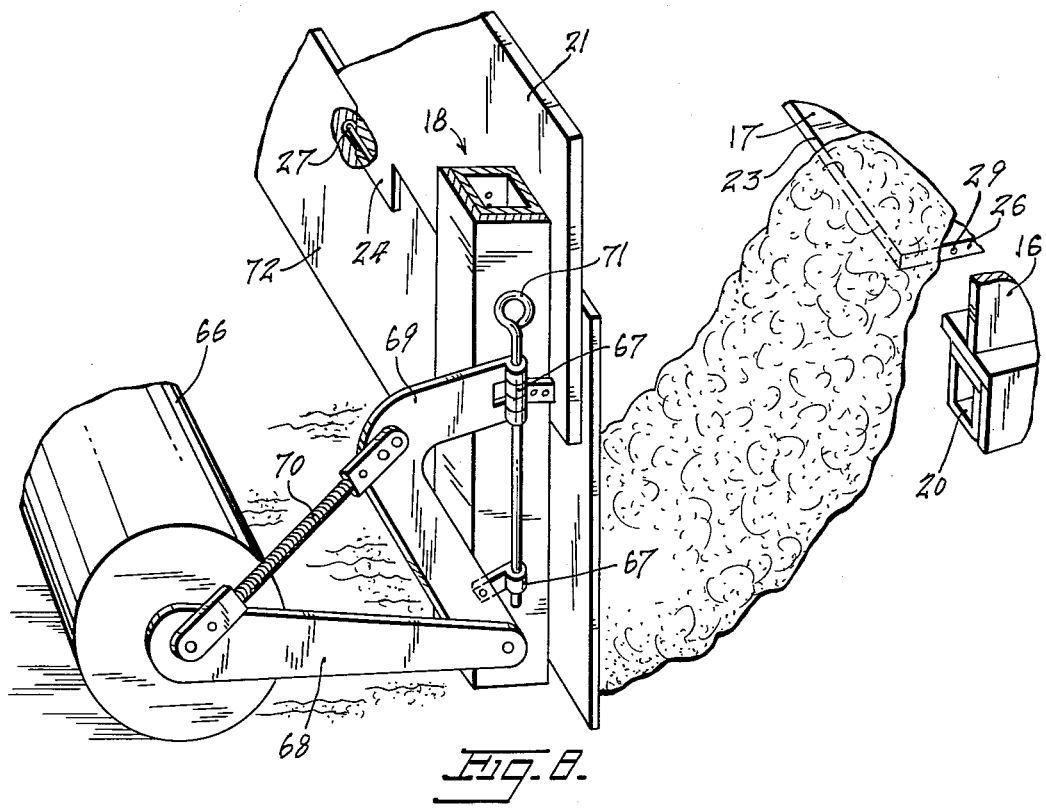
Fig. 8 is an enlarged detail view illustrating the packer roller attachment.

A latch 32 (Fig. 7) of heavy stock is pivotally secured at one end on the tail-gate adjacent the top of the gate and at each side edge and a coacting latching member 33 of heavy stock open at the top is provided on the frame 18 adjacent the top thereof to receive the latch and secure the tail-gate when it is up as shown in Fig. 1. A similar coacting latching member 34 is provided on the frame 18 adjacent the bottom thereof to secure the tail-gate 21 when it is fully down hanging vertically as shown in Figs. 7 and 8. A wheel 35 rotatably secured to the frame 18 is connected with the tail-gate 21 by any suitable connection, such as a rack and gear connection to raise and lower it.

The beams or extension members 19 have holes 36 (Fig. 11) provided in their flanges and similar aligning holes 37 are formed in the channels 20 secured to the underside of floor 17. A removable pin 38 locks the sliding extension members in place either in the closed body position shown in Fig. 1 or in the extended positions shown in Figs. 2, 4, 7 and 8.

A loading roller 39 is rotatably mounted on the tail-gate 21 along its lower edge 22 and disposed so that when the tail-gate is down abutting and held parallel with the floor 17, the roller 39 will be upwardly disposed to assist in loading lumber or other long material on the truck body.

The loading roller 39 is provided with a locking groove 40 and a latch 41 is pivotally secured to the end frame 18 to seat in the groove 40 and lock the roller against rotation when the loading is completed.

End plates 18ᵃ are provided on each end frame 18 to support a vertical side loading roller 39ᵃ, and to facilitate the rolling off lumber or other load from the truck.

Preferably, sides 15 and 16 of the body are removably secured to the floor 17, slots 42 being provided in the floor to receive the bottom projections 43 (Fig. 2) on bottom edge of the sides. The sides preferably are secured to the body with their rear ends spaced further apart than their front ends.

Skid holes 44 are formed in the cross member 45 of the rear end frame 18 to receive skids 46 when skid loading or unloading is desirable.

Means now to be described serves to push or slide material on the floor 17 off the rear edge of the floor when the rear end frame 18 is extended as shown in Figs. 7 and 8 with a dump opening between the rear edge of the floor and the frame.

The pusher means 47 includes a carriage 48 secured to a conveyor 49, the conveyor 49 being two conveyor chains 50 rotatably mounted for travel along the floor endwise of the floor. The surface of the floor has conveyor chain grooves 51 (Fig. 9) formed in it to receive the chains and covers 52 are fastened to the chains to shield them. The carriage 48 is bolted to the chain 50ᵃ and the chains are driven by sprockets (not shown) which are operatively connected with the motor of the truck on which the body is mounted.

Figure 6:
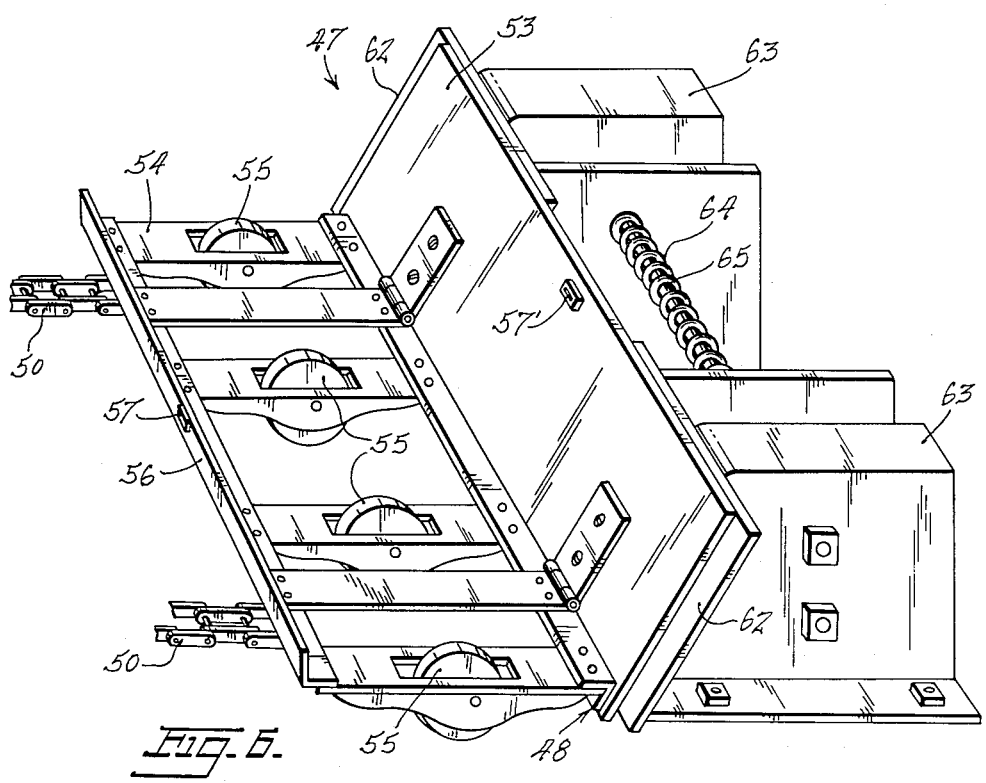
Fig. 6 is a perspective detail view of the pusher carriage of the new truck body.

Carriage 48 has a back plate 53 with a drop plate 54 hinged to it (see Fig. 6). A plurality of spaced wheels 55 are rotatably mounted on the drop plate 54 and an angle iron lumber rest 56 is secured to the front or top of the drop plate. A drop plate latch 57 on the drop plate coacts with a latch 57' on the back plate 53 to hold the drop plate vertically against the back plate in folded position.

Figure 9:
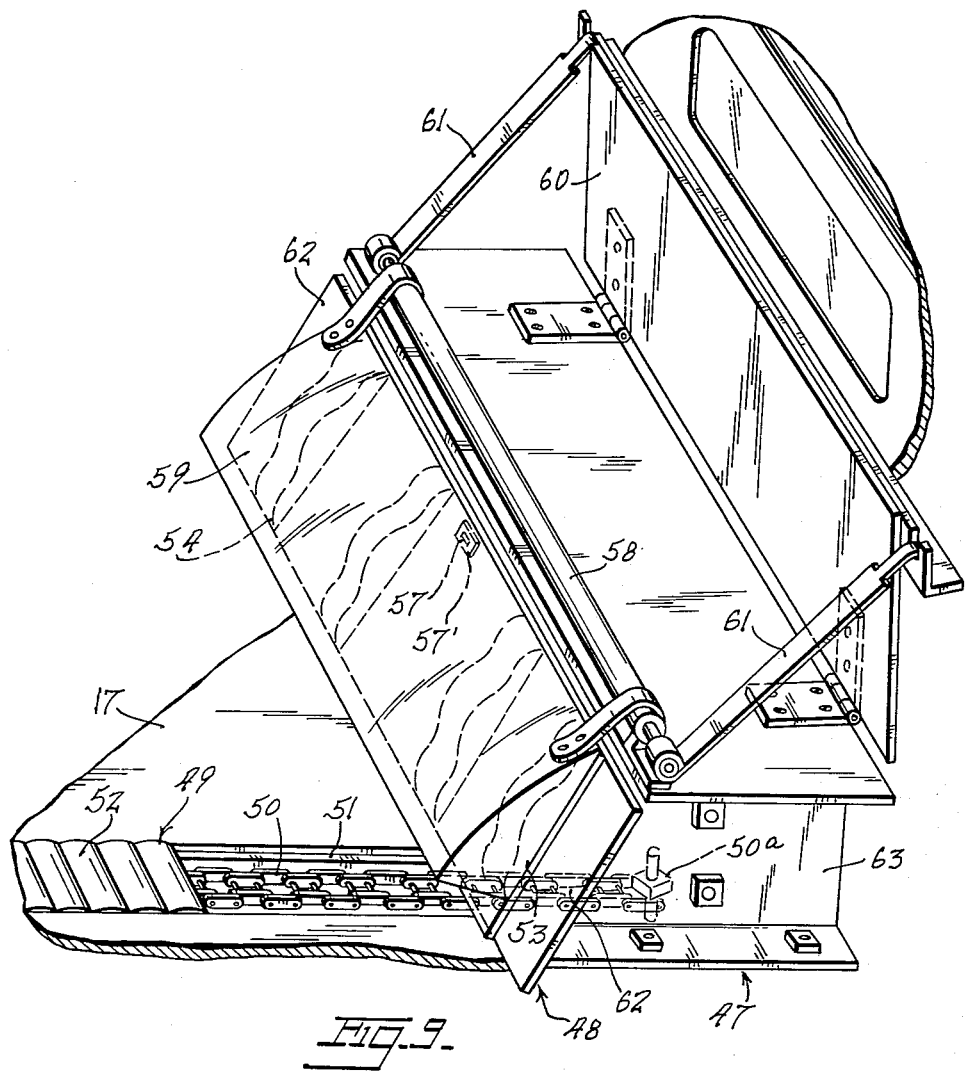
Fig. 9 is a similar view of the pusher carriage as equipped for dump truck use.

A second loading roller 58 (Figs. 4 and 9) is located and rotatably mounted on top of the carriage 48 to aid in the loading of long material such as building lumber. Loading roller 58 is constructed like loading roller 39. A front cover 59 is removably hinged to the loading roller 58 to cover the back plate and drop plate when the drop plate is raised as shown in Fig. 9. This shields the carriage when sand, gravel and the like are being dumped from the body.

A protective shield 60 is also hinged to the carriage with straps 61 removably holding the shield in upright position to protect the cab and driver and to keep a load in the body from falling off forwardly.

Extensible members 62 are slidably secured to the back plate of the carriage and to blocks 63 substantially at right angles thereto. Extension springs 64 on rod 65 bias the blocks 63 outwardly and thus serve as means to bias the extensible members outwardly against the sides of the body as the carriage is drawn along the floor. In this manner, the pusher means extends fully across the body at all times even though the sides of the body get further apart as the carriage progresses toward the rear of the floor.

When the rear end frame 18 is extended to provide a dump opening between the frame and the rear edge of the floor, the tail-gate 21 may be lowered to hang vertically as has been described. In this position, the tail-gate serves as a spreader for material shoved off the rear edge of the floor of the body. A packer roller 66 (Figs. 7 and 8), is rotatably secured to the frame 18 to roll material dropped from the floor and spread by the tail-gate.

Frame 18 has roller securing brackets 67 on one side and the packer roller 66 is rotatably connected to a support arm 68, a support brace 69 is pivotally attached to the support arm 68 and a spring 70 between the support arm and brace is secured at one end to each. A pin 71 serves as means removably to fasten the support brace to the securing brackets 67.

An additional spreader plate 72 preferably is removably secured to the tail-gate 21 by the locking pins 27 coacting with socket openings in the edge walls of cut-outs in the plate and held vertical by the frame to assist in spreading. The tail gate may however be used as a spreader without the plate 72.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A truck body comprising a floor, two sides, a vertically disposed rear end frame and a tail-gate on said frame, spaced body extension beams fixed perpendicularly to the frame and slidably connected with the floor to extend the frame from a position abutting the rear edge of the floor outwardly to a position spaced therefrom, said tail-gate being pivotally connected with the frame to swing inwardly and downwardly toward the floor for abutment there-against when the frame is extended for closing the space between the frame and floor to form an extension of said floor, means for securing said tail gate in either raised or lowered position, pusher means on the floor to slide material from the floor, said pusher means having a carriage with a back plate and a drop plate hinged to the back plate, said drop plate having a lumber rest thereon, and a conveyor chain rotatably mounted for travel along the floor, said carriage being secured to the conveyor chair for travel therewith, said tail gate being further swingable to form in the lowered vertical position a spreader plate, said sides of the body being secured to the floor with their rear ends spaced a greater distance apart than their front ends, extensible members slidably secured to the back plate of the carriage and means to bias the extensible members outwardly against the side of the body as the carriage is drawn along the floor, and a front cover removably secured to the carriage over the back plate and drop plate when the drop plate is raised.

2. A truck body comprising a floor, two sides, a vertically disposed rear end frame and a tail-gate on said frame, spaced body extension beams fixed perpendicularly to the frame and slidably connected with the floor to extend the frame from a position abutting the rear edge of the floor outwardly to a position spaced therefrom, said tail-gate being pivotally connected with the frame to swing inwardly and downwardly toward the floor for abutment there-against when the frame is extended for closing the space between the frame and floor to form an extension of said floor, means for securing said tail gate in either raised or lowered position, pusher means on the floor to slide material from the floor, said pusher means having a carriage with a back plate and a drop plate hinged to the back plate, said drop plate having a lumber rest thereon, and a conveyor chain rotatably mounted for travel along the floor, said carriage being secured to the conveyor chain for travel therewith, said tail gate being further swingable to form in the lowered vertical position a spreader plate, said sides of the body being secured to the floor with their rear ends spaced a greater distance apart than their front ends, extensible members slidably secured to the back plate of the carriage and means to bias the extensible members outwardly against the side of the body as the carriage is drawn along the floor, and a protective shield pivotally secured to the carriage with means to hold the shield in raised position to keep a load in the body from falling forward.

3. A truck body comprising a floor and side walls, a vertically disposed rear end frame, spaced extension beams fixed perpendicularly to said end frame and slidably connected to the floor to extend the end frame from a position abutting the floor to a position spaced from the floor, a tail gate hingedly connected along its lower edge to said end frame at approximately floor level whereby when the end frame is in extended position the tail gate can be swung forwardly to form an extension of said floor or can be swung into lowered vertical position to act as a spreader plate for gravel which may be dumped from said truck floor ahead of the rear end frame, means for securing said extension beams in various extended positions relative to the truck floor, and means for securing said tail gate in either raised vertical, horizontal or in lowered position.

4. A truck body comprising a floor and side walls, a vertically disposed rear end frame, spaced extension beams fixed perpendicularly to said end frame and slidably connected to the floor to extend the end frame from a position abutting the floor to a position spaced from the floor, a tail gate hingedly connected along its lower edge to said end frame at approximate floor level whereby when the end frame is in extended position the tail gate can be swung forwardly to form an extension of said floor or can be swung into lowered vertical position to act as a spreader plate for gravel which may be dumped from said truck floor ahead of the rear end frame, means for securing said extension beams in various extended positions relative to the truck floor, and means for securing said tail gate in either raised vertical, horizontal or in lowered position, and a loading roller rotatably mounted on the tail gate along its lower edge and adapted to be upwardly disposed when the tail gate is lowered to form an extension of the floor.

5. A truck body comprising a floor and side walls, a vertically disposed rear end frame, spaced extension beams fixed perpendicularly to said end frame and slidably connected to the floor to extend the end frame from a position abutting the floor to a position spaced from the floor, a tail gate hingedly connected along its lower edge to said end frame at approximate floor level whereby when the end frame is in extended position the tail gate can be swung forwardly to form an extension of said floor or can be swung into lowered vertical position to act as a spreader plate for gravel which may be dumped from said truck floor ahead of the rear end frame, means for securing said extension beams in various extended positions relative to the truck floor, and means for securing said tail gate in either raised vertical, horizontal or in lowered position, and means on the body to push material off the rear edge of the floor when the rear end frame is extended and the tail gate is in lowered vertical position.

6. A truck body comprising a floor and side walls, a vertically disposed rear end frame, spaced extension beams fixed perpendicularly to said end frame and slidably connected to the floor to extend the end frame from a position abutting the floor to a position spaced from the floor, a tail gate hingedly connected along its lower edge to said end frame at approximate floor level whereby when the end frame is in extended position the tail gate can be swung forwardly to form an extension of said floor or can be swung into lowered vertical position to act as a spreader plate for gravel which may be dumped from said truck floor ahead of the rear end frame, means for securing said extension beams in various extended positions relative to the truck floor, and means for securing said tail gate in either raised vertical, horizontal or in lowered position, means on the body to push material off the rear edge of the floor when the rear end frame is extended and the tail gate is in lowered vertical position, a loading roller rotatably mounted on the tail gate along its lower edge adapted to be upwardly disposed when the tail gate is lowered to form an extension of the floor, and a second loading roller rotatably mounted on the pushing means.

7. A truck body comprising a floor and side walls, a vertically disposed rear end frame, spaced extension beams fixed perpendicularly to said end frame and slidably connected to the floor to extend the end frame from a position abutting the floor to a position spaced from the floor, a tail gate hingedly connected along its lower edge to said end frame at approximate floor level whereby when the end frame is in extended position the tail gate can be swung forwardly to form an extension of said floor or can be swung into lowered vertical position to act as a spreader plate for gravel which may be dumped from said truck floor ahead of the rear end frame, means for securing said extension beams in various extended positions relative to the truck floor, and means for securing said tail gate in either raised vertical, horizontal or in lowered position, a loading roller rotatably mounted on the tail gate along its lower edge and adapted to be upwardly disposed when the tail gate is lowered to form an extension of the floor, and releasable means to lock the roller against rotation when the loading is completed.

8. A truck body comprising a floor and side walls, a vertically disposed rear end frame, spaced extension beams fixed perpendicularly to said end frame and slidably connected to the floor to extend the end frame from a position abutting the floor to a position spaced from the floor, a tail gate hingedly connected along its lower edge to said end frame at approximate floor level whereby when the end frame is in extended position the tail gate can be swung forwardly to form an extension of said floor or can be swung into lowered vertical position to act as a spreader plate for gravel which may be dumped from said truck floor ahead of the rear end frame, means for securing said extension beams in various extended positions relative to the truck floor, and means for securing said tail gate in either raised vertical, horizontal or in lowered position, and means on the body to push material off the rear edge of the floor when the rear end frame is extended and the tail gate is in lowered vertical position, said pushing means including a conveyor mounted for movement across the floor and a carriage secured to the conveyer.

9. A truck body comprising a floor and side walls, a vertically disposed rear end frame, spaced extension beams fixed perpendicularly to said end frame and slidably connected to the floor to extend the end frame from a position abutting the floor to a position spaced from the floor, a tail gate hingedly connected along its lower edge to said end frame at approximate floor level whereby when the end frame is in extended position the tail gate can be swung forwardly to form an extension of said floor or can be swung into lowered vertical position to act as a spreader plate for gravel which may be dumped from said truck floor ahead of the rear end frame, means for securing said extension beams in various extended positions relative to the truck floor, and means for securing said tail gate in either raised vertical, horizontal or in lowered position, and means to push material off the rear edge of the floor when the rear end frame is extended and the tail gate is in lowered vertical position, said pushing means including a carriage with a back plate and a drop plate hinged to the back plate, said drop plate having a lumber rest thereon, a conveyor chain movable along the floor, and means of connection between the chain and carriage whereby said carriage moves with the chain.

References Cited in the file of this patent

UNITED STATES PATENTS

| | | |
|---|---|---|
| 439,104 | Brown | Oct. 28, 1890 |
| 862,597 | Wilson | Aug. 6, 1907 |
| 1,439,257 | Ogren | Dec. 19, 1922 |
| 1,485,631 | Shea | Mar. 4, 1924 |
| 1,695,609 | Richter | Dec. 18, 1928 |
| 1,883,473 | Barrett | Oct. 18, 1932 |
| 2,318,886 | Paiement | May 11, 1943 |
| 2,512,339 | Knapp | June 20, 1950 |
| 2,630,928 | McCombs | Mar. 10, 1953 |